R. C. PARSONS.

FLUID PUMP, TURBINE, AND THE LIKE.

APPLICATION FILED JAN. 21, 1920.

Reissued Nov. 16, 1920. 14,988.

2 SHEETS—SHEET 1.

Inventor:

Richard Clive Parsons by Kemon & Kemon

Kemon & Kemon

Attys.

R. C. PARSONS.

FLUID PUMP, TURBINE, AND THE LIKE.

APPLICATION FILED JAN. 21, 1920.

Reissued Nov. 16, 1920.

14,988.

2 SHEETS—SHEET 2.

Inventor.
Richard Clare Parsons
by
Kenyon & Kenyon
Attys.

UNITED STATES PATENT OFFICE.

RICHARD CLERE PARSONS, OF LONDON, ENGLAND.

FLUID PUMP, TURBINE, AND THE LIKE.

14,988. Specification of Reissued Letters Patent. Reissued Nov. 16, 1920.

Original No. 1,254,156, dated January 22, 1918, Serial No. 67,521, filed December 18, 1915. Application for reissue filed January 21, 1920. Serial No. 353,040½.

*To all whom it may concern:*

Be it known that I, the Honorable RICHARD CLERE PARSONS, M. A., M. Inst. C. E., a subject of the King of Great Britain and Ireland, and residing at 39 Victoria street, London, S. W., England, have invented certain new and useful Improvements in and Relating to Fluid Pumps, Turbines, and the like, of which the following is a specification.

This invention relates to improvements in centrifugal pumps, turbine type fluid pumps, or water turbines and the like, of the type in which resilient blades are employed.

When centrifugal pumps, for example, are employed for pumping fluid containing sand or other abrasive matters, it is found that serious abrasion of the internal parts takes place, with resulting great reduction of efficiency, besides giving rise to frequent and costly repairs; and when such pumps are used for pumping fluids containing fibrous matter or the like, such matter becomes wedged between the impeller and the surfaces against which it revolves, frequently causing stoppage of the pump.

The object of the present invention is to overcome these difficulties.

The invention consists in an improved form of pump in which the vanes of the impeller are constructed entirely of resilient material the face against which it contacts also being constructed of resilient material, while the passages through which the fluid passes are of such form that with the vane resiliency, solid, fibrous and other matters will pass through the pump readily and without blocking it.

The invention also consists in the improved constructions of pumps hereinafter described.

The invention is applicable to centrifugal pumps of any of the well-known forms, having unshrouded impellers with either single or double inlet.

By the use of the resilient impellers, and suitable grooves in the surface of the casing against which they contact, according to the invention, fibrous and the other solid matters are readily passed through the pump. Owing to the resiliency of the blades, aided by the grooves in the face of the casing, these are enabled to overrun any fibrous and other matters which may lodge between them and the casing, the revolution of the succeeding resilient blades giving successive impulses to the lodged matter, until it is finally expelled from the pump. The wear of the pump by sand or other abrasive matter is greatly reduced by the use of the rubber or like coating, it having been found by experiment that rubber of the quality specially selected is, under the conditions existing, less liable to abrasion than metal.

Referring to the accompanying drawings:—

Figure 1 is a transverse section of one form of pump constructed according to the invention;

Figs. 2, 3 and 4 being similar views of modified forms.

Figure 1:
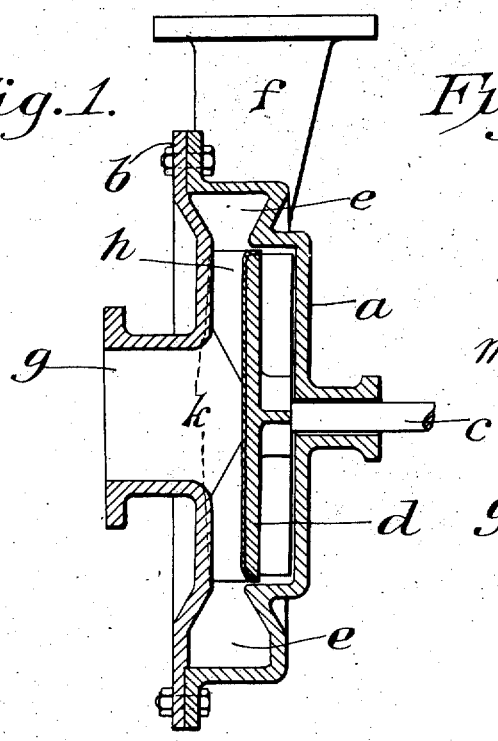
Figure 6:
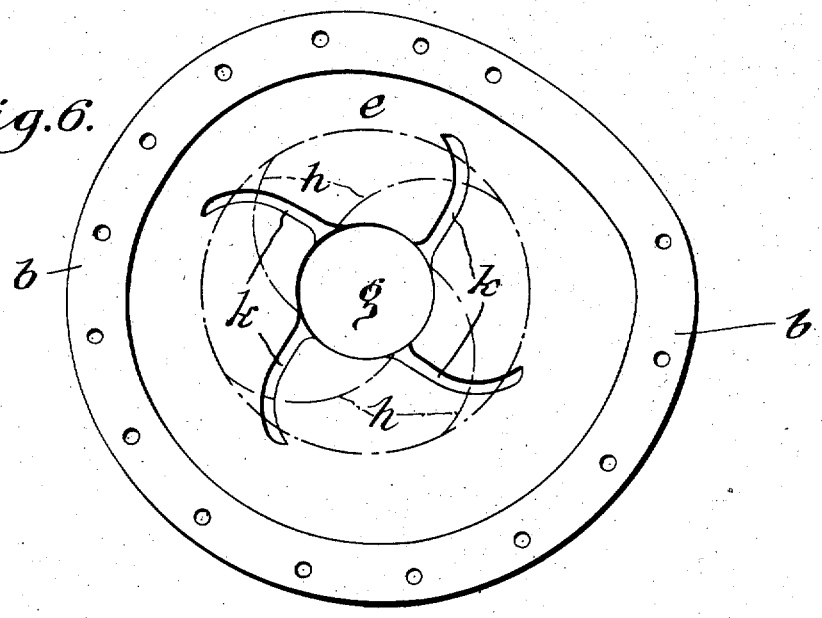
Fig. 6 is a view of the front portion of the casing, as seen from the interior of the pump, showing the grooves in the face.
Figure 5:
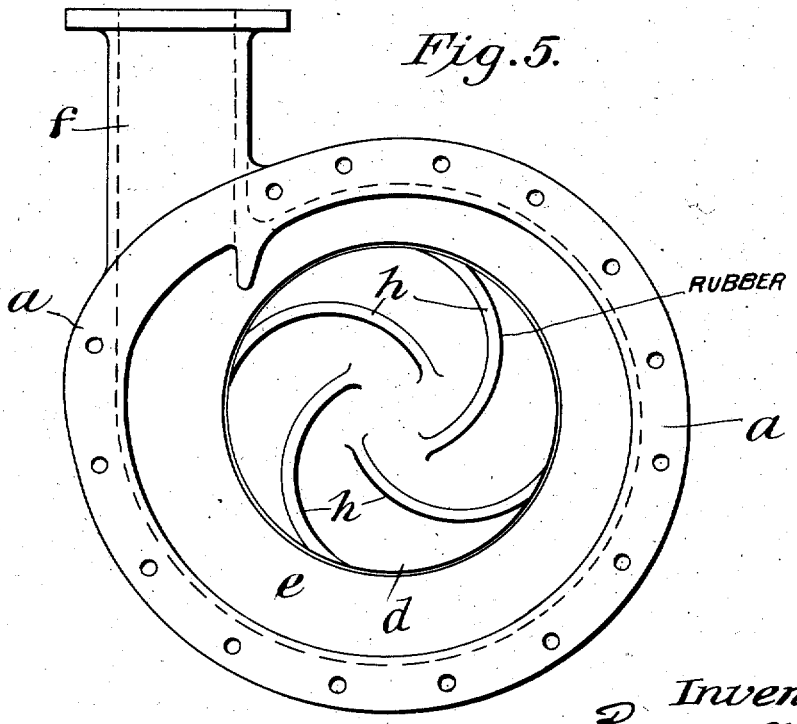
Fig. 5 is a front view of the pump shown in Fig. 1, the front portion of the casing being removed.

In carrying the invention into effect, according to the form shown in Fig. 1, which represents a centrifugal pump of the single inlet type, the pump chamber is constructed of two parts, *a*, *b* respectively. The back portion *a* contains the bearing, which is lubricated with a stream of water, and also an air pipe for balancing purposes and in which works the spindle *c* carrying the impeller *d*, and attached to which is the necessary thrust bearing. This part also contains the outer or volute chamber *e* of the pump, and the discharge pipe or outlet *f*. The volute chamber *e* is closed at the front by the part *b*, which is connected to the back portion by bolts passing through flanges on the two parts. The center of the portion *b* of the pump is provided with a circular aperture *g*, which serves as the inlet. The impeller is constructed in the following manner:—The center is constructed of metal which is suitably attached to the spindle upon which it revolves. The front face of this metal is provided with deep grooves, following the line of the usual impeller blades, and by the use of a suitable mold impeller blades *h* of the usual shape but of rubber are formed on the face of the impeller. The rubber is arranged to fill the grooves in the front face of the impeller, these grooves being preferably of dovetail form, so as to secure the rubber to the metal, and preferably considerably wider than the thickness of the blades, so that a heavy rubber root is formed, so as to allow bending of the impeller blades without overstressing. The rubber of which these vanes are formed is allowed to extend over and to be securely cemented to the flat face of the impeller. The outer circumference of the impeller lies just within the orifice of the delivery chamber *f*. Spiral grooves *k* are formed in the face of the part *b* adjacent to the impeller blades, these grooves being of the form illustrated in Fig. 6, and continued some distance along the inlet pipe *g*. These grooves *k* assist in the removal of solid particles which are swept into the grooves and then along them toward the circumference by the rotation of the impeller blades.

Figure 2:
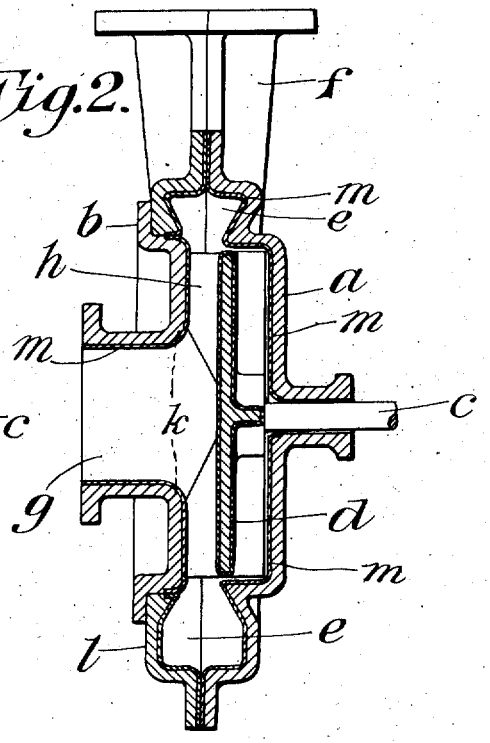

In the form of the invention illustrated in Fig. 2, which is suitable for pumping fluids containing abrasive material, the back casing of the pump *a* contains only one-half of the volute chamber *e*, and of the outlet pipe *f*, the other half of each of these being formed by the front portion *l*, so that these two portions of the front consist of simple castings without cores. The central opening of the part *l* of the casing is of slightly greater diameter than the impeller *d*, so that the latter can be withdrawn through it. This opening is closed in by a casting *b* having a central inlet *g*. The whole of the interior surface of these parts, and the front and rear surfaces and circumference of the impeller, are so arranged that they can be easily rubbered over such area as may be required for any special duty, the rubber *m* being simply molded on to the several parts, as illustrated. The vanes for balancing purposes at the back of the impeller may also be made of rubber if desired.

Figure 3:
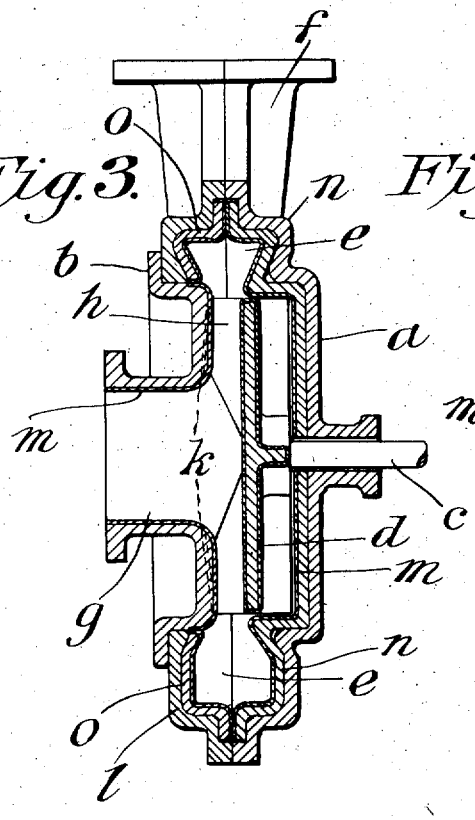

In the form of the invention shown in Fig. 3, which is specially suitable for pumps employed in dredging, and in some mining operations, such as pumping slimes and tailings, where the wear on the pumps is very great, a secondary chamber or lining *n*, *o*, may be provided inside the outer casing of the pump, specially designed to easily receive the rubber facing and constructed so that it can be easily removed and re-rubbered.

Figure 4:
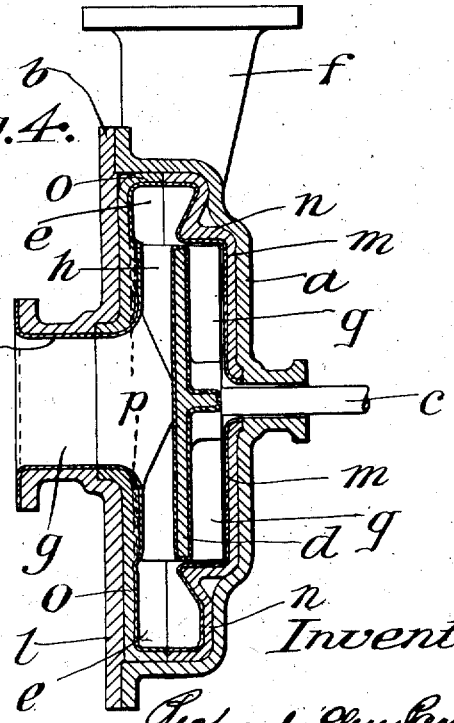

Another form of such a separate casing is shown at Fig. 4, the casing here being constructed in two parts, *o* and *n*, which are arranged to contain the volute chamber *e*. The portion of *o* against which the impeller contacts contains grooves similar to those already described.

In this form of the invention, the parts *n*, *o* forming the pump chamber are mounted inside a second chamber formed by the two parts *a*, *b*, the part of the second chamber *a* carrying the impeller bearings. The back of the propeller is provided with balancing vanes *q*, which rotate in the chamber formed at the back of the propeller between the two parts *n* and *o*. The inner chamber *e* is of the usual spiral form, and has all its inner surfaces forming the fluid passages lined with rubber vulcanized onto the two parts *n*, *o*. The delivery orifice of the pump spiral is opposite a continuation branch with an outside flange formed on the outer chamber, the inner chamber being bolted circumferentially to the outer chamber.

In cases where pumps are lined with hard metal plates, great deterioration takes place at the joints of such plates, and the casings to which they are attached. According to my invention, I may prevent this by coating the face or edge or both ends of such plates with rubber, or by coating the casing under the plates.

Having now described my invention, what I claim as new and desire to secure by Letters Patent is:—

1. A centrifugal pump comprising in combination a casing, a resilient lining completely covering the inner surface of said casing, and impeller including a rotating disk and vanes made entirely of resilient material carried on the side of said disk, as and for the purposes described.

2. A centrifugal pump comprising in combination a casing, a resilient lining completely covering the inner surface of said casing, grooves in the face of said resilient lining, said grooves being in the direction of flow of the fluid through the pump, an impeller including a rotating disk and vanes made entirely of resilient material carried on the side of said disk, as and for the purposes described.

3. A centrifugal pump having an impeller of disk form with blades of resilient material laterally projecting therefrom determining the flow of the fluid, and capable of permitting the passage of fibrous and other matters without blocking.

4. A centrifugal pump having an impeller of disk form with backwardly curved blades of resilient material laterally projecting therefrom determining the flow of the fluid, and capable of permitting the passage of fibrous and other matters without blocking.

5. A centrifugal pump comprising in combination an impeller of disk form with blades of resilient material projecting from at least one side thereof, a casing having at least one inner side surface adapted to close laterally the passages between the said blades co-acting with said impeller to deliver the impelled fluid while permitting the passage of fibrous and other matters without blocking.

6. A centrifugal pump comprising in combination an impeller of disk form with backwardly curved blades of resilient material projecting from at least one side thereof, a casing having at least one inner side surface adapted to close laterally the passages between the said blades co-acting with said impeller to deliver the impelled fluid while permitting the passage of fibrous and other matters without blocking.

7. A centrifugal pump comprising in combination an impeller of disk form with blades of resilient material projecting from at least one side thereof, a casing having at least one inner side surface adapted to close laterally the passages between the said blades co-acting with the said impeller to deliver the impelled fluid, and grooves in said inner side surface assisting the passage of fibrous and other matters.

8. A centrifugal pump comprising in combination an impeller of disk form with backwardly curved blades of resilient material projecting from at least one side thereof, a casing having at least one inner side surface adapted to close laterally the passages between the said blades co-acting with the said impeller to deliver the impelled fluid, and grooves in said inner side surface assisting the passage of fibrous and other matters.

9. A centrifugal pump comprising in combination an impeller of disk form with blades of resilient material projecting from at least one side thereof, a casing having at least one inner side surface adapted to close laterally the passages between the said blades co-acting with the said impeller to deliver the impelled fluid, and forwardly curved grooves in said inner side surface assisting the passage of fibrous and other matters.

10. A centrifugal pump comprising in combination an impeller of disk form with backwardly curved blades of resilient material projecting from at least one side thereof, a casing having at least one inner side surface adapted to close laterally the passages between the said backwardly curved blades co-acting with the said impeller to deliver the impelled fluid, and forwardly curved grooves in said inner side surface assisting the passage of fibrous and other matters.

11. A centrifugal pump comprising in combination a casing, grooves in said casing said grooves being in the direction of flow of fluid through said pump, an impeller in said casing, vanes carried by said impeller and having a resilient surface engaging the part of the casing containing said grooves.

12. A centrifugal pump comprising in combination a casing having an interior surface with grooves therein, an impeller in said casing and resilient vanes on said impeller engaging the surface of said casing having the grooves therein.

13. A centrifugal pump comprising in combination a casing having an inner surface, an impeller in said casing having vanes with a resilient surface bearing against the inner surface of said casing.

14. An impeller for centrifugal pumps comprising a portion of non-elastic material with grooves therein and elastic vanes carried in the grooves of said non-elastic material.

In testimony whereof I have signed my name to this specification.

RICHARD CLERE PARSONS.